United States Patent [19]
Fegley et al.

[11] 3,752,363
[45] Aug. 14, 1973

[54] CONTROL FOR INJECTION MOLDING MACHINE

[75] Inventors: Donald Fegley, Lakewood; Sobhy T. Khalil, Mayfield Heights; Carl M. Lrick, Mentor; Leonard P. Nypaver, Westlake, all of Ohio

[73] Assignee: Van Dorn Plastic Machinery Company, Cleveland, Ohio

[22] Filed: Nov. 12, 1971

[21] Appl. No.: 198,398

[52] U.S. Cl. .................. 222/63, 222/334, 425/145, 425/149
[51] Int. Cl. ............................................. B29h 5/24
[58] Field of Search ............................. 222/63, 334; 425/135, 145, 146, 149

[56] References Cited
UNITED STATES PATENTS

| | | |
|---|---|---|
| 3,693,946 | 9/1972 | Merrit ............................ 425/145 X |
| 3,647,309 | 3/1972 | Thompson ...................... 425/145 X |
| 3,509,600 | 5/1970 | Noble ............................... 425/145 |
| 3,695,800 | 10/1972 | Hutchinson et al ................ 425/146 |

Primary Examiner—H. A. Kilby, Jr.
Attorney—James H. Tilberry, A. C. Body et al.

[57] ABSTRACT

Variations in the longitudinal speed of movement of the screw of a plastic injection molding machine is achieved by control means which function to provide for speed changes to occur at preselected positions of the screw relative to the injection stroke thereof. The screw speeds and the positions of the screw at which speed changes occur are manually settable by corresponding pairs of dials on a control board positioned at the machine and which dials readily provide visual indication of the speed and position settings.

11 Claims, 6 Drawing Figures

Patented Aug. 14, 1973

INVENTORS.
DONALD R. FEGLEY
SOBHY T. KHALIL
CARL M. IRICK
LEONARD P. NYPAVER

BY
Meyer, Tilberry & Body
ATTORNEYS.

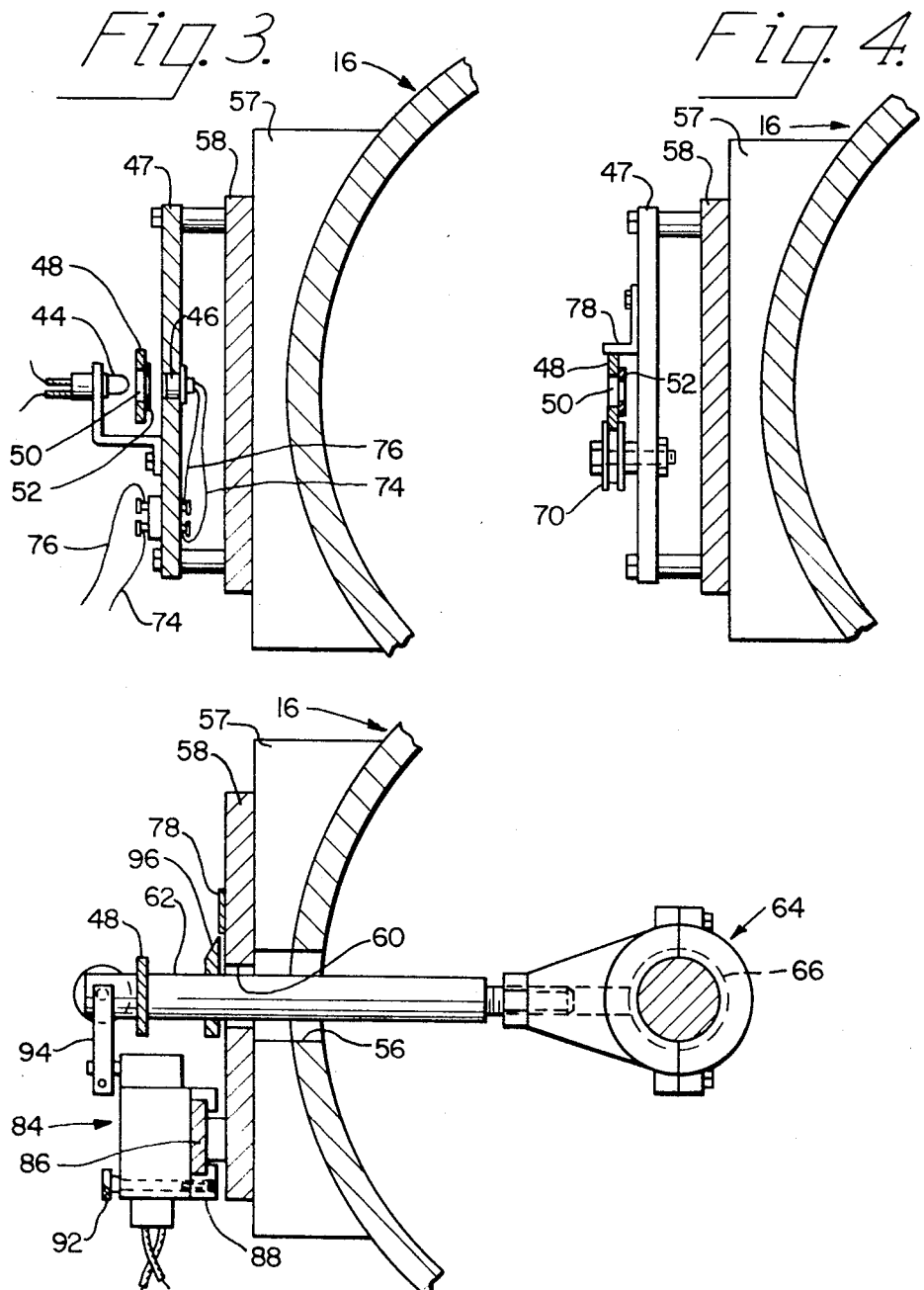

Patented Aug. 14, 1973

INVENTORS.
DONALD R. FEGLEY
SOBHY T. KHALIL
CARL M. IRICK
LEONARD P. NYPAVER

BY
Meyer, Tilberry & Body
ATTORNEYS.

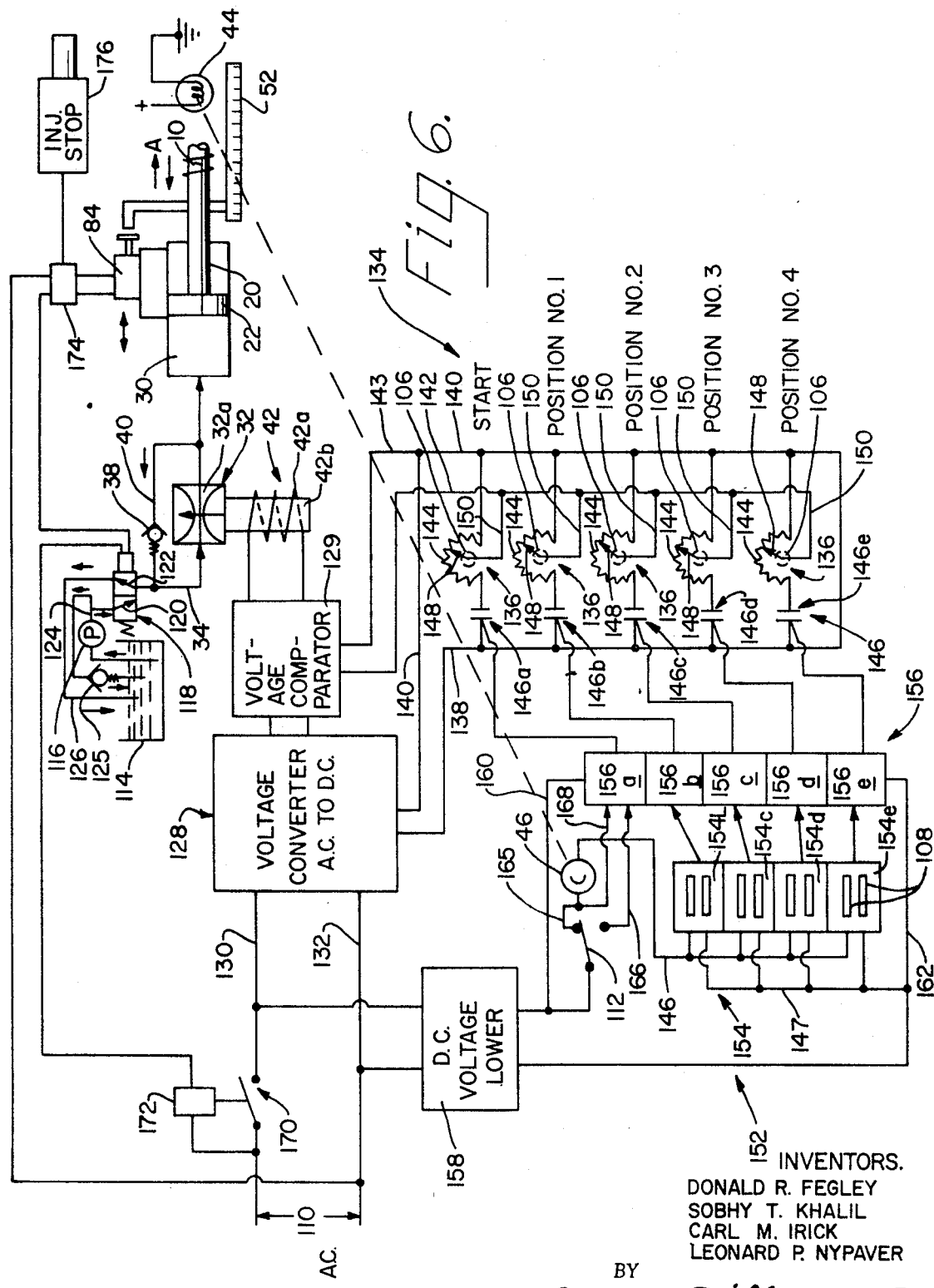

CONTROL FOR INJECTION MOLDING MACHINE

This invention relates to the art of plastic injection molding and, more particularly, to the control of a plastic molding machine screw during the injection stroke thereof.

Injection molding machines have been provided heretofore which employ a rotatable and reciprocable plasticizing screw disposed within an elongated tubular chamber having nozzle means at the forward or outer end thereof. In machines of this character, material to be plasticized is introduced into the chamber adjacent the inner or rear end thereof, and rotation of the screw within the tubular chamber operates to plasticize the material and to deliver a quantity of the plasticized material to the forward end of the chamber. The pressure of the accumulating material at the forward end of the chamber forces the screw to move rearwardly of the chamber until a predetermined amount of material called a "shot" is available at the forward end of the chamber to achieve a desired injection molding operation in which the material is introduced under pressure through the nozzle and into a mold cavity associated with the nozzle. When the shot of material is available in the forward end of the chamber, the screw is displaced forwardly in the chamber providing an injection stroke by which the shot is discharged through the nozzle and into the mold cavity. Upon completion of the injection stroke, rotation of the screw operates to provide the next accumulation of plasticized material, and the injection cycle is repeated. The injection rate of the screw is generally identified in terms of volume of displacement per unit of time such as, for example, cubic inches per second. Regardless of the units of measure it will be appreciated that the injection rate is proportional to linear speed of the screw.

The injection rate of the screw during certain portions of the injection stroke thereof is of extreme importance with regard to achieving the most desirable quality in the injection molded product. In this respect, if at a certain portion of the stroke the rate of fill of the mold is too high as a result of a high injection rate, air may be trapped in the mold cavity. At another portion, if the injection rate is too high the mold cavity may become overpacked with plasticized material resulting in a product which is overweight. Further, control of the injection rate of the screw is essential to prevent surface defects on thick molded products, such as flow lines or folds which can result from a rate which is too slow or too fast. Screw injection rate control is also essential to control flash resulting from flow of the plastic material outwardly from the mold cavity between the mold parts. Accordingly, it becomes desirable to provide for controlling the screw injection in order to avoid the foregoing difficulties, and to provide for varying the injection rate during an injection stroke of the screw in order to achieve the most desirable results with regard to a particular product being produced and/or a particular plastic material being employed, or to influence machine operation in another area thereof.

Control of the injection rate of the screw in injection molding machines of the foregoing character has been provided heretofore. For example, cam and follower arrangements have been provided for controlling the flow of hydraulic fluid employed to drive the screw through its injection stroke. The use of a fixed cam structure is accompanied by several disadvantages none the least of which is the fact that the operator of the machine has no immediate control over the pattern of screw feed defined by the cam. Once the cam is assembled with respect to the machine, the pattern of feed can not be altered without the time consuming operation of shutting down the machine, removing the cam and replacing the cam with a cam having a modified pattern. Adjustable cams have been employed and are defined, for example, by laterally flexible metal strips and finger actuated screws by which the strip contour can be changed. Establishing a desired pattern with either type of cam arrangement involves the design and preparation of a cam pattern to achieve the desired program. Such a procedure requires preparing a graphic representation of the screw stroke pattern desired and then at least for a fixed cam, constructing a cam to provide the pattern. This is not only time consuming, but requires the efforts of personnel skilled in the design and construction of cams. The average workman assigned to operate an injection molding machine may not be so skilled and, accordingly, is of little help when pattern changes must be made.

With an adjustable cam track strip, it will be appreciated that it is most difficult to readily achieve adjustment with a desirable degree of accuracy. Moreover, it is difficult, if not impossible to adjust the cam from one position to another and then back to the exact setting of the one position. A further difficulty with regard to mechanical cam arrangements lies in the fact that the cam follower must be directly connected to the flow control valve. Thus the cam must be located close to the valve to avoid the use of long, heavy actuator linkage therebetween, and even when the cam and valve are closely spaced, such linkage introduces errors in controlling the valve. Still further, as the size of the machine increases, larger valves are required and accordingly the size of the cam and linkage becomes undesirably large and space consuming.

Screw feed control has also been achieved in the past by manual manipulation of hydraulic flow control valves. Control in this manner, however, does not provide a desirable degree of accuracy and, moreover, is limited with respect to the extent to which speed changes can be introduced during a given screw stroke.

The foregoing difficulties and others of screw feed control arrangements heretofore available are advantageously overcome in accordance with the present invention. In this respect, a desired pattern of control of the injection stroke of a screw is achieved by means of control apparatus which can readily be set by the machine operator without any special skill being required. More particularly, a desired program of screw feed in terms of linear speed and displacement is adapted to be established by the machine operator simply by manually adjusting dials including a series of pairs of dials on a panel board disposed at the machine. The dials have appropriate indicia associated therewith which facilitate program establishment in a minimum amount of time and which provide a visual indication of the screw injection program which the machine is set to follow. One of the pairs has indicia preferably in the form of numerals corresponding to a percentage of maximum speed and the other of the pairs has numerals corresponding to increments of the injection stroke of the screw. Thus, to establish a desired program of movement which the screw is to follow during a given injection stroke the operator need only set the pairs of dials in accordance with a pre-established numerical schedule corresponding to rates of speed at various distances of displacement desired for the injection molding of a given product. Of considerable advantage too is the fact that if, during a particular injection molding operation, it becomes obvious that a portion or portions of the program should be modified, the operator can readily modify that portion of the program simply by manipulating one or more of the dials, and this can be achieved advantageously in many instances without shutting down the machine and without disturbing other portions of the program. Further, major changes from one program to another such as are encountered in the injection molding of two different products can readily be made simply by changing the settings of the dials to achieve the new program, whereby considerable time is saved in changing from one program to another.

In accordance with a further aspect of the present invention, the injection screw is hydraulically driven in the injection stroke direction through an electro-hydraulic variable flow valve through which the rate of fluid flow is generally proportional to an electrical control signal delivered to the valve. The speed of injection screw movement accordingly depends on the rate of flow through the valve. The dials on the control panel include a first set of dials each settable to indicate the speed at which the screw is to travel from one position to another in the direction of the injection stroke. The control panel also includes a second set of dials adapted to be set to indicate the positions or points along the screw stroke path at which speed changes are to take place. Once the dials have been set, electronic control means operate to control the valve to achieve screw movement in accordance with the dial settings. The setting of the speed control dials establishes a program of speed control signals to be sequentially delivered to the valve for fluid flow therethrough to be at predetermine rates, whereby movement of the screw in the injection stroke direction and during a given injection stroke is at different speeds. The setting of the position dials establishes a program of control signals which are operative sequentially to trigger the delivery of a corresponding speed control signal to the valve to effect speed changes at given distances of the screw from the injection stroke start position thereof. The speed control dials are each calibrated in increments of from 0 to 100 percent of available screw speed and the position setting dials are each calibrated in increments corresponding to a linear measure of distance. Further, the position setting control provides for a speed change to be programmed to take place at any one of the increments of distance from the beginning to the end of the injection stroke. Thus, it will be appreciated that a wide variety of patterns or programs of screw movement is provided for in accordance with the present invention and that all of the equipment necessary to establish a program of control for a given injection stroke of a screw is advantageously available at all times in the form of a very compact simple control panel arrangement disposed at the machine. Thus, program establishment, program changing, and program modification can all be achieved more expeditiously and more accurately than heretofore possible whereby increased operating efficiency and decreased production costs are advantageously realized.

Further in accordance with the present invention, the dials are arranged on the control panel in a manner intended to facilitate the setting of a given program by the machine operator with a minimum of mental effort. In this respect, the speed control dials are alike in appearance, the position control dials are alike in appearance and the two sets of dials are different in appearance from one another. Thus, the dial sets are readily distinguishable to avoid confusion in the setting thereof. Further, the speed setting dials are arranged in spaced sequence along one generally straight line, the position setting dials are arranged in equally spaced sequence along another generally straight line parallel to the one line, and corresponding ones of the dials of the two sets are aligned with respect to lines generally perpendicular to the straight lines. Thus, sequential setting of the dials is advantageously provided for in a manner whereby confusion as to which dials are to be turned to a particular setting is avoided. As a further feature, lights may be provided on the panel board between corresponding speed setting and position setting dials so that at any given time during injection screw movement the operator can determine at a glance the speed and position of the screw.

It is accordingly an outstanding object of the present invention to provide an injection molding machine screw control arrangement whereby a machine operator can readily establish, change or modify a program of injection stroke movement by manipulating manual control elements.

A further object is to provide an injection molding machine screw feed control arrangement wherein the setting, changing or modifying of a desired program of injection stroke movement can be achieved by the operator in a minimum amount of time and with a minimum of mental effort on the part of the operator.

Another object is the provision of a control arrangement of the foregoing character wherein the program of injection screw movement is readily established by the manual setting of dials.

Yet another object of the present invention is the provision of a control arrangement of the above character wherein an infinite number of programs of screw movement can be selectively established by the operator for the full range of variables of screw speed from zero to maximum and the total linear distance of the injection stroke.

Still another object of the present invention is the provision of a control arrangement of the foregoing character which provides for the injection stroke pattern of movement in terms of speed and linear displacement to be readily variable and manually programmable, thus simplifying the establishment, changing or modifying of the pattern of movement to provide for increased machine operating efficiency and reduced production costs.

A further object of the present invention is the provision of an injection molding machine having a hydraulic drive for displacing the screw in the injection stroke direction, the hydraulic drive being controlled through an electro-hydraulic variable flow valve, and wherein an electronic control system including manually settable dials provide for establishing and delivering a desired program of electrical control signals to the valve to energize the valve so as to achieve a desired program of screw movement.

Yet another object of the present invention is the provision of injection molding apparatus of the above character wherein the dials are calibrated in terms of screw speed and screw position and are manually settable to define a program of sequential movement of the screw from one position to another in the stroke direction and at different speeds.

The foregoing objects and others will in part be obvious and in part more fully pointed out hereinafter in conjuction with the description of the drawings in which:

FIG. 3 is a sectional elevation taken along line 3—3 in FIG. 2;

FIG. 4 is a sectional elevation taken along line 4—4 in FIG. 2;

FIG. 5 is a sectional elevation taken along line 5—5 in in FIG. 2; and

FIG. 6 is a schematic diagram of hydraulic and electronic control circuitry in accordance with the present invention.

Figure 1:
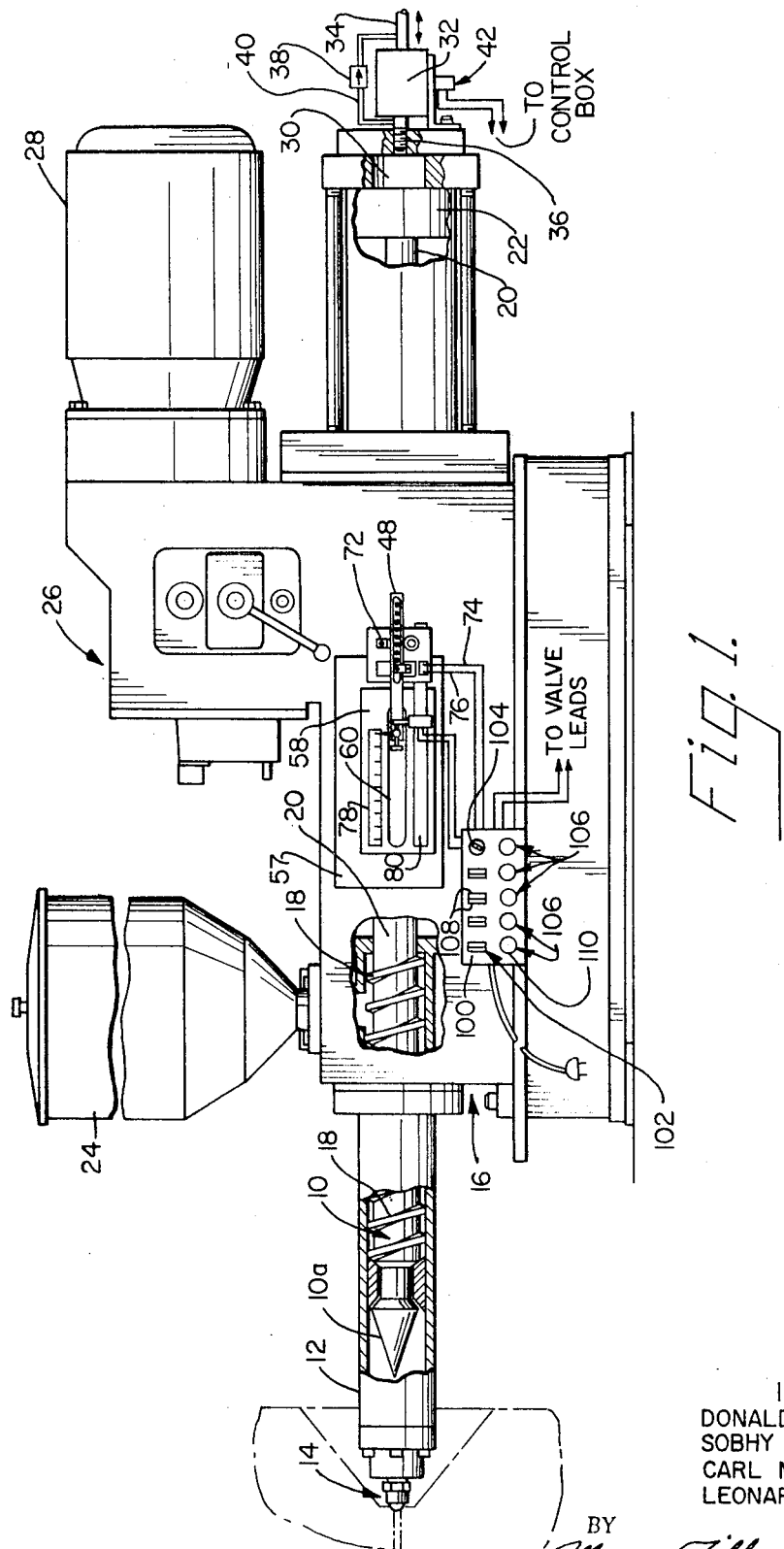
FIG. 1 is an elevation view, partially in section, of injection molding apparatus in accordance with the present invention.
Figure 2:
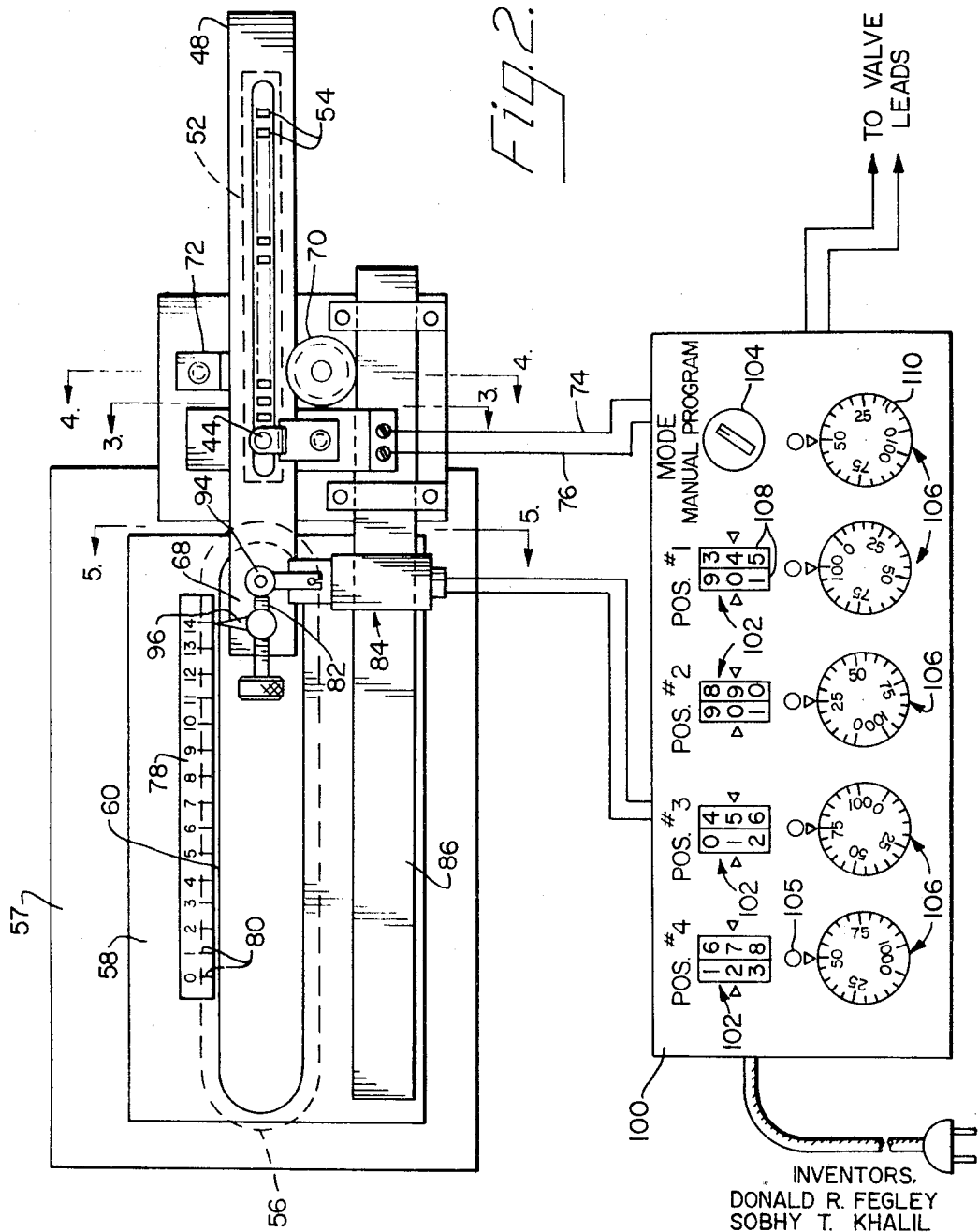
FIG. 2 is an enlarged elevation view of components of the control system illustrated in FIG. 1.

Referring now to the drawing in greater detail wherein the showings are for the purpose of illustrating the preferred embodiment of the present invention only and not for the purpose of limiting the same, a reciprocating rotary plasticizing screw mechanism for plastic injection molding apparatus is illustrated in FIG. 1 which includes an elongate plasticizing screw 10 supported for rotation and reciprocating movement within an elongate chamber defined by casing 12. Casing 12 is provided at its free end with a nozzle 14 and is suitably mounted at its other end to housing or frame 16. Screw 10 includes a threaded portion having flights 18 thereon and a shank portion 20 therebehind which extends rearwardly from the threaded portion and is suitably interconnected with piston means 22 forming a component of a hydraulic drive system by which the screw is advanced toward nozzle 14 during the injection stroke, as set forth more fully hereinafter. In a manner well known, housing 16 carries a hopper 24 which opens into the screw chamber to deliver raw plastic material thereinto. Further, housing 16 includes a transmission section 26 in which suitable gearing is provided for imparting rotation to screw 10, and a suitable drive motor 28 is mounted on transmission section 26 to drive the gearing and thus the screw. It will be appreciated that the screw drive may be electric or hydraulic and that the drive may be direct rather than through a transmission section.

Following an injection stroke, screw 10 is disposed forwardly with its nose portion 10a disposed adjacent nozzle 14. Raw plastic material is then introduced into the screw chamber from hopper 24, and rotation of the screw through motor 28 causes the material to be plasticized and to accumulate at the nozzle end of casing 12. Accumulation of the material at the nozzle end of the chamber causes screw 10 to move rearwardly until the screw reaches a start position for the next injection stroke thereof. When screw 10 reaches the start position, hydraulic fluid under pressure is introduced into chamber 30 behind piston 22 to move screw 10 forwardly to achieve a discharge of the accumulated shot of plastic material through the nozzle 14. The start position for screw 10 is determined by the quantity of shot material to be discharged during the injection stroke of the screw. As pointed out more fully hereinafter, the start position in accordance with the present invention is readily adjustable, whereby the injection stroke of the screw is variable within the total stroke available. Thus, the machine is readily adjustable to provide for the discharge of different quantities of shot material through the nozzle. For purposes of the description to follow, however, the machine is illustrated as being set for a full injection stroke of the screw, which stroke is illustrated in FIG. 1 as being a 14 inch stroke. It will be appreciated that the total stroke available will vary from one size machine to another.

In accordance with the present invention, movement of screw 10 in the direction of nozzle 14 and through the injection stroke thereof is achieved through a hydraulic drive system including an electro-responsive variable flow control valve 32 suitably mounted on the apparatus to provide for fluid flow into chamber 30 behind piston 22. Valve 32 is connected to a source of hydraulic fluid under pressure through line 34 and is provided with an outlet conduit 36 leading to chamber 30. A check valve 38 is provided in a bypass line 40 extending around valve 32 to permit return flow of fluid from chamber 30 to the source in response to rearward movement of screw 10 following an injection stroke thereof. Electro-responsive flow control valve 32 is of the character including a flow control element which is responsive to an electric control signal to vary the rate of fluid flow therethrough in proportion to the magnitude of the control signal. The valve includes an electro-responsive actuator portion 42 which includes a displaceable core and means such as a current responsive coil or winding thereabout to which control signals are supplied in the manner set forth hereinafter to control valve operation. It will be appreciated that any one of a number of electro-responsive flow control valves could be employed to achieve variable flow control of the foregoing character. One suitable flow control valve is an electro-hydraulic variable flow valve produced by Racine Hydraulics of Racine, Wisconsin under the manufacturer's designation FF2-EHS*-06*. This valve is pressure rated at 3,000 psi and has controllable flow rates of 1.5 to 30 gallons per minute or 2.0 to 60 gallons per minute. The first asterisk represent a selection between P and S designations defining respectively. 30 and 60 gallons per minute flow capacity. The second asterisk represents a selection between S and E designations defining, respectively, internal or external pilot. This particular valve advantageously compensates for variations of inlet hydraulic fluid pressure and viscosity to provide for maintaining a constant flow output under conditions of changing inlet pressure. Further, the valve is responsive to electrical signals having a current range of from 0 to 160 ma DC. In the embodiment being described, flow rate through the valve from zero to maximum flow rate is in response to a signal range of from about 45 ma to about 145 — 150 ma DC.

Further in accordance with the present invention, means is provided to deliver electric control signals to actuator portion 42 of valve 32 to provide for variable flow through the valve and into chamber 30 to achieve programmed movement of the screw 10 through an injection stroke thereof. The programmed movement advantageously provides for advancing screw 10 toward nozzle means 14 at predetermined rates of speed, which rates of speed may be different and may be changed at selected positions along the length of the injection stroke. The rate of speed of screw 10 is dependent on the magnitude of the electrical control signal delivered to the actuating means of valve 32. As pointed out more fully hereinafter, the control system provides for sequentially delivering control signals of desired magnitudes to the actuator portion of the valve during the injection stroke of the screw to achieve speed changes. The position or positions of screw 10 along the injection stroke path at which speed changes are desired are adapted to be determined by means including a position detecting assembly associated with the screw, and the control system functions when the screw reaches a predetermined position to deliver a speed control signal to the valve to change the screw speed.

The position detecting assembly, as illustrated in FIGS. 1, 2, 3, 4 and 5 includes a pulse producing assembly mounted on housing 16 and including a source of light such as a bulb 44 and a photoelectric cell 46. Bulb 44 and cell 46 are suitably mounted on a plate 47 which in turn is suitably secured to a plate 58 mounted on housing 16. Bulb 44 and cell 46 are supported in fixed relationship with respect to housing 16 and in operative alignment with one another. A thin, elongated plate 48 is disposed between bulb 44 and cell 46 and is provided with an elongated slot 50 therein to permit light from bulb 44 to energize cell 46. Plate 48 carries a slotted plate 52 on one side thereof. Plate 52 is provided with a plurality of slots 54 equally spaced apart along the length thereof a distance corresponding to increments of the total stroke of the screw. The spacing of slots 54 may, of course, be varied as desired, and in the embodiment illustrated, the slots are spaced one quarter inch apart whereby four slots correspond to one inch of screw movement. Plate 48 and thus slotted plate 52 are adapted to move with screw 10 in response to reciprocating movement thereof. In this respect, housing 16 is provided with an elongated opening 56 and a support plate 58 is suitably attached to and supported by a support portion 57 which may be integral with or attached to housing 16 outwardly of opening 56. Plate 58 has an elongated opening 60 corresponding generally with opening 56 and a rod component 62 extends through openings 56 and 60 and into housing 16. The inner end of rod 62 is provided with a collar 64 disposed in a circumferential recess 66 in the shank portion of screw 10. The screw recess and collar fit is such as to provide for the screw to rotate relative to the collar, and the cooperating collar and recess thus provide for screw 10 to rotate relative to rod 62 and to move rod 62 therewith during reciprocating movement thereof. End 68 of plate 48 is suitably attached to rod 62 so that reciprocating movement of rod 62 imparts corresponding reciprocating movement to plate 48. A lower guide roll 70 and an upper guide arm 72 may be provided intermediate the opposite ends of plate 48 to support the plate for reciprocating movement and to maintain the plate in proper lateral and vertical positions relative to bulb 44 and cell 46.

It will be appreciated that as screw 10 moves forwardly towards nozzle 14 plate 48 moves forwardly therewith, whereby slots 54 are brought into alignment successively with bulb 44 and cell 46. Each time a slot 54 is so aligned with the bulb and cell, cell 46 is energized to transmit a pulse signal which functions as pointed out more fully hereinafter in conjuction with electronic components of the control system to control the delivery of an electic control signal to valve 32. To facilitate the transmission of a pulse signal, cell 46 is provided with conductor means 74 and 76 which are electrically connected with the control circuitry as set forth hereinafter. Further, it will be understood that bulb 44 is connected to a suitable voltage source, not illustrated.

In order to initiate operation of a preselected program of injection stroke movement for the screw, means is provided to energize the control system in response to rearward movement of the screw to a predetermined position defining the start position for the particular stroke. As mentioned hereinabove, the start position may be any position along the path defining the total stroke available for the screw. In the embodiment illustrated, the start position is illustrated as being the rearward most possible position for the screw, and the screw is illustrated as having a total stroke of 14 inches. More particularly, support plate 58 carries indicia means 78 having numerals 80 spaced along the length thereof and corresponding to the total stroke in inches available for the screw. Thus, the character 0 at the forward end of the indicia means indicates the forward most position to which the screw moves during an injection stroke, and the numeral 14 at the opposite end of the indicia means indicates the rearward most point or position for the starting of an injection stroke in the particular machine illustrated.

Switch means is provided to energize the control system and initiate injection stroke movement of screw 10 when the screw moves rearwardly to the start position. More particularly, rod 62 carried by screw 10 is provided on its outer end with a switch actuator screw 82 which is externally threaded for cooperation with a threaded aperture provided therefor in rod 62. Switch means 84 is adjustably secured to a switch mounting plate 86 which is suitably attached to support plate 58. Mounting plate 86 is adapted to releasably support switch means 84 for longitudinal movement therealong for a distance corresponding to the available length of injection stroke of screw 10. For example, the switch housing may be provided with flanges 88 and 90 on the inner side thereof, and means such as screws 92 may be provided to extend through the switch housing and into threaded engagement with flange means 88 in a manner whereby the switch means is clamped in place relative to mounting bar 86 when screws 92 are tightened. Switch means 84 preferably is a microswtich unit and is provided with a pivotal actuator arm 94 which is pivotal about an axis parallel to the axis of rod 62 and is disposed in the path of movement of actuator screw 82 carried by the rod. Accordingly, when actuator screw 82 engages actuator arm 94 the latter is pivoted to actuate the switch to initiate the controlled program movement in the manner set forth hereinafter.

By providing for switch means 84 to be longitudinally adjustable along support bar 86, it will be appreciated that the switch can be positioned at any desired location along the total length of the screw injection stroke so as to be actuated in response to rearward movement of the screw into engagement therewith following an injection stroke. When the switch is actuated the injection stroke proceeds and the point at which the switch is located defines the starting point for the injection stroke. Accordingly, the control arrangement in accordance with the present invention advantageously provides a floating start point which can readily be adjusted to provide for the screw to have an injection stroke of any desired length up to the maximum stroke length provided by the particular machine. By providing for the switch actuating screw 82 to be adjustable relative to bar 62, it will be appreciated that the screw can be adjusted relative to switch actuator arm 94 to more accurately define the starting position and to compensate for any inaccuracies in the starting position resulting from component wear and the like.

Preferably, rod 62 is provided with indicator or pointer means 96 which is movable therewith to visually indicate the position of the screw relative to the total injection stroke available therefore. Thus, in FIG. 1 pointer 96 indicates that the screw is in its rearward most position and that the machine is set to operate with a total injection stroke of the screw of 14 inches. It will be further appreciated that the indicator moves with the screw to visually indicate the position of the screw at any given time during the injection stroke.

Advantageously, in accordance with the present invention, the establishing of a desired program of screw movement during the injection stroke thereof is readily achieved simply by setting dials for the control system, which dials are arranged on a control panel 100 and are accessible at the machine. Panel board 100 may define the front panel of an enclosure for the electronic components of the system or may be separated from the electronic components. In any event, the dials provide for the manual setting of a program to be readily achieved and provide a visual indication of the program. Control panel 100 is provided with a plurality of pairs of position setting dials 102, a main selector control dial 104 and a plurality of speed control dials 106. Dial 104 operates a selector switch 112 described below. In the embodiment illustrated, four position setting dial sets 102 are provided and five speed control dials 106 are provided.

The following description of the control system will be discussed in conjunction with this number od dials, but it will be readily apparent that the number of dial sets 102 and dials 106 could be increased or decreased if desired. Each position setting dial set 102 includes a pair of independently settable thumb wheels 108 rotatable about axes parallel to the plane of panel board 100. Each wheel 108 is provided with numeral 0 through 9 equally spaced apart about the periphery of the wheel. Each numeral on the left hand wheel corresponds to the distance between 10 slots 54 of slotted plate 52 of the position detecting assembly, and each numeral on the right hand wheel corresponds to the distance between adjacent slots 54. Thus, each numeral on a left thumb wheel 108 represents 2½ inches of movement of the screw in the injection stroke direction and each numeral on a right hand thumb wheel represents one quarter inch of movement in accordance with the present embodiment. Dial sets 102 are arranged in sequence to provide for setting positions #1, #2, #3 and #4 of stroke movement. The increments of stroke movement are measured from the starting point of the injection stroke as determined by the setting of limit switch means 84, in this instance the fully retracted position of the screw. Position #1 of the screw is a first position to which the screw is to move in the direction of the injection stroke when the latter is initiated. The setting and operation of the screw position thumb wheels will be described hereinbelow.

Speed setting dials 106 are provided for establishing selected speeds of screw movement in sequence from one screw position to the next. It will be noted that one more speed setting dial is provided than screw position dial sets. The extra speed setting dial is identified as a start dial, and the remaining speed setting dials are designated as corresponding to positions #1, #2, #3 and #4 of screw advancement. Each speed setting dial 106 is provided with indicia on the periphery thereof corresponding to a range of screw speed of from 0 to 100 percent of the maximum speed at which the screw is adapted to be advanced by the hydraulic drive means. While the indicia preferably is provided in units of percent of maximum speed, it will be appreciated that the indicia could be provided in other units of measurement of linear speed. In addition to position setting dial sets 102 and speed setting dials 106 a manual mode selecting dial 112 is provided for selectively setting the control to perform a dialed program or, alternatively, to bypass program control in the manner set forth hereinafter. It will be noted that speed setting dials 106 are arranged sequentially in line or row and that position setting dial sets 102 and selector dial 104 are arranged sequentially in a line or row parallel to that of the speed setting dials. Moreover, the speed setting and position setting dials corresponding to positions #1, #2, #3 and #4 of the screw are in alignment with one another along lines perpendicular to the parallel rows. This arangement advantageously presents the several dials in a sequential pattern progressing from the start position through the four positions at which speed changes can take place, thus to facilitate the ease with which a program of screw movement can be established with a minimum of chance for error resulting from confusion on the part of the operator. Preferably, to further enhance visual presentation of the program and to provide for readily determining the speed and position of the screw at any given time during the injection stroke, indicator lights 105 are provided between the aligned speed control and position control dials corresponding to positions #1, #2, #3 and #4 and between selector dial 104 and the start speed dial. These lights are adapted to be energized sequentially to visually indicate the location of the screw along the injection stroke path, whereby the operator can at a glance readily determine the position of the screw and by looking at the speed setting dial therebelow determine the speed at which the screw is moving at that particular time.

The manner in which a program of movement of the screw during the injection stroke is established will be best understood by way of a specific example. In this respect, let it be assumed that for a particular product being produced it has been determined that the screw should be advanced from the start position a distance of 1 inch at 50 percent of the maximum speed available, that the screw should advance from the 1 inch position to a position 2-¼ inches from the start at 100 percent or maximum speed, that the screw should move from the 2-¼ inch position to a position 3-¾ inches from the start position at 25 percent of the maximum speed, that the screw should advance from the 3-¾ inch position to a position 6-¾ inches from the start position at 75 percent maximum speed, and that the screw should advance the remainder of the injection stroke at 50 percent maximum speed. This program is illustrated on panel board 100 in FIG. 1. In this respect, the starting speed dial is set at 50 to indicate 50 percent speed for initial movement of the screw from the start position, and dial set 102 corresponding to position #1 of the screw is set to read 04. Since θ inch increments of movement of screw 10 are detected as mentioned above and in a manner set forth more fully hereinafter, it will be appreciated that the 04 setting corresponds to 1 inch of screw displacement from the start position. From the latter position it is desired that the screw advance at 100 percent or maximum speed to the next or #2 position setting, and accordingly, speed setting dial 106 corresponding to position #1 is set at 100. Dial set 102 corresponding to position #2 is set to read 09 which corresponds to 2-¼ inches from the start position of the screw. Thus, the screw will advance to position #2 at 100 percent speed. The speed setting dial corresponding to position #2 is set at 25 percent speed and the dial set 102 corresponding to position 233 of the screw is set to read 15. Accordingly, the screw will advance from position #2 to position #3, a distance 3-¾ inches from the start position, at 25 percent of maximum speed. The speed setting dial corresponding to position #3 is set to read 75 and dial set 102 corresponding to position #4 is set to read 27. Accordingly, screw 10 will move from the #3 position to the #4 position, a distance of 6-¾ inches from the start position, at 75 percent of maximum speed. The speed setting dial corresponding to position #4 is set to read 50, and since there are no further position setting dials the screw will advance the remainder of the injection stroke at 50 percent maximum speed. It will be appreciated that injection stop means is provided to de-energize the control system when the screw has advanced to the end of the injection stroke, whereafter raw plastic material is introduced into the screw chamber and the screw retracts rearwardly. When rearward movement of the screw causes switch actuating screw 82 to engage switch arm 94, the control system is re-energized and a new injection stroke is initiated under the control thereof. It will be appreciated that during rearward movement of the screw the hydraulic fluid of the drive unit in chamber 30 behind piston 22 is bypassed around valve 32 through check valve 38 and line 40 and back to the fluid source. Valve 32 is de-energized at this time, as set forth hereinafter.

The hydraulic drive system for the screw and the electronic control system by which programmed movement of the screw is achieved are schematically illustrated in FIG. 6 of the drawing, and the manner in which screw movement is achieved in accordance with the program example described above will be more clearly understood from the following description of FIG. 6. With reference first to the hydraulic drive system, electro-hydraulic variable flow control valve 32 described hereinabove has inlet line 34 thereto connected with a source 114 of hydraulic fluid such as oil through a pump 116 and two-way solenoid actuated valve means 118 having a pair of passages 120 and 122. Energization of the solenoid of valve means 118 shifts passages 120 and 122 for passage 120 to connect valve inlet line 34 with pump line 124 and for flow through passage 122 to be blocked. Thus, when the solenoid is energized, hydraulic fluid flows through valve 32 to chamber 30 of the injection molding screw assembly. Passages 120 and 122 are shifted in response to de-energization of the solenoid for passage 122 to connect bypas line 40 to fluid return line 126 and to block flow through passage 120 to valve 32. Thus, de-energization of solenoid valve means 118 provides for return flow of hydraulic fluid to source 114 through check valve 38 and around flow control valve 32. Actuation of solenoid valve means 118 is explained more fully hereinafter. A check valve 125 is connected in pump line 124 on the outlet side of pump 116 as a pressure limiting valve which provide for flow of fluid back to source 114 if the fluid pressure on the outlet side of the pump exceeds a predetermined maximum system pressure.

It will be appreciated that other arrangements of the controlled flow control valve 32 relative to the source 114 and and chamber 30 are possible. For example, the pump output could be connected to chamber 30 through valve 32 and the return flow line could be connected to source 114 through a two way valve having one line directly connected to source 114 and a second line connected to the source through relief valve 125. During the injection stroke the second line would be open so that excess fluid would be returned to the source if the system pressure exceeded a predetermined limit. During the return stroke of the screw, the first line through the two way valve would be open to permit return flow of fluid to source 114.

As mentioned hereinabove, the rate of fluid flow through valve 32 is variable and is determined by the magnitude of a control signal imposed on actuator portion 42 of the valve. Actuator portion 42 includes a winding or coil 42a, a core 42b and means, not illustrated, responsive to energization of coil 42a and displacent of core 42b to adjust the size of the flow passageway 32a through the valve and thus the rate of flow therethrough. During the injection stroke screw 10 moves in the direction of arrow A. The speed at which the screw moves in this direction depends upon the rate of fluid flow through valve 32 which in turn is determined by the magnitude of the electric control signal imposed on coil 42a. Coil 42a is electrically connected to the DC output of suitable AC to DC converter means 128 through voltage comparator means 129 which functions in the manner hereinafter set forth. Converter means 128 is connected across conductors 130 and 132 of a standard 110 or 220 volt AC supply. It will be appreciated that converter 128 includes means to rectify the AC supply thereto, which means forms no part of the present invention, and that the DC output therefrom may be selectively variable.

The magnitude of the electric control signals delivered to coil 42a, and thus the speed of screw 10 during an injection stroke is established and controlled by means including speed control circuit means 134 comprised of a plurality of potentiometer circuits 136a – 136e each connected across output lines 138 and 140 from converter 128 and each having an output to comparator 129 through leads 142 and 143. More particularly, potentiometer circuits 136a – 136e include corresponding resistance windings 144a – 144e having one end thereof connected to lead 140 and the other end thereof connected to lead 138 through a corresponding one of electro-responsive switch components 146a – 146e. Slider contact 148 of each potentiometer device is connected to lead 142 by means of conductor 150, and lead 143 to comparator 129 is connected to lead 140 from converter 128. Still further, each slider contact 148 is adapted to be rotated relative to the corresponding resistance winding by a corresponding one of the speed setting dials 106 described hereinabove. Accordingly, it will be appreciated that a potentiometer circuit is provided as illustrated for each of the start position and positions #1, #2, #3 and #4 of screw movement. Switches 146a – 146e are normally open and are sequentially closed as described hereinafter to provide for electrical speed control signals to be delivered sequentially to comparator 129 and from the comparator to valve coil 42a. The magnitude of a signal delivered to the comparator depends of course on the position of the movable contact 148 relative to the corresponding resistance winding. It will be appreciated that voltage comparator 129 is operable in response to a signal from a given one of the potentiometer circuits 136a – 136e to compare the magnitude of that signal with a predetermined or standard voltage signal to derive a voltage difference defining the electric control signal delivered to valve coil 42a.

As mentioned hereinabove, switches 146a – 146e are sequentially closed beginning with the switch 146a which corresponds to the start position of the screw. As each switch is closed in sequence the preceding switch is opened, whereby a sequence of speed control signals are delivered to valve coil 42a which are proportional in magnitude to the magnitude of the signal through the corresponding potentiometer device. As further mentioned hereinabove, speed control changes are adapted to take place when the screw reaches the first, second, third and fourth positions thereof with respect to the start position. Accordingly, switches 146a – 146e are adapted to be closed in sequence beginning with switch 146a when the screw is in the start position. Thereafter switches 146b – 146e close in sequence when the screw reaches positions #1, #2, #3 and #4 thereof during the injection stroke. Control of the sequential closing of the switches and the opening of a preceding switch in the sequence is achieved by screw position responsive control means 152 which includes position detecting means defined by lamp 44 and photo electric cell 46, electronic pulse counting means 154 and electronic sequencing switch means 156. Position responsive control means 152 is energized through the DC output of a suitable voltage converter 158 connected across power lines 130 and 132.

Electronic sequencing switch means 156 includes electronic sequencing switches 156a – 156e corresponding, in order, to electro-responsive switches 146a – 146e. Switches 156a – 156e are operable when actuated to deliver a control signal to the corresponding one of the switches 146a – 146e and to de-energize the preceding sequencing switch in a manner to cancel the output signal thereof to its corresponding switch 146. Sequencing switches 156a – 156e are electronically interrelated to achieve the foregoing function, and the specific electrical structures thereof do not form a part of the present invention. The sequencing switches are connected across DC output lines 160 and 162 from converter 158.

Pulse counting means 154 includes a plurality of electronic pulse counting circuits 154b – 154e corresponding, in order, to sequencing switches 156b – 156e. Moreover, each of the pulse counting circuits has an output to the corresponding sequencing switch. Accordingly, pulse counting circuits 154b – 154e correspond to positions #1, #2, #3 and #4 of the screw. Electronic pulse counting circuits are well known and the specific electrical structure of counters 154b – 154e does not form part of the present invention. Each counter circuit, however, is adapted to be manually set to count a given number of electric pulses fed thereto and to deliver an output signal to the corresponding sequencing switch when the given number of pulses has been counted. Setting of each pulse counter circuit is achieved by means of dials 108 of position setting dial sets 102 described hereinabove. The pulse counting circuits are adapted to be connected across the output of converter 158 through switch 112 and conductor 165 leading to photo-responsive cell 46, through conductor means 164 leading from cell 46 to the counters and by conductor means 147 leading from the counters to lead 162. Manually actuable switch 112, described hereinabove, is adapted to be manipulated to selectively close a circuit through cell 46 and the pulse counters or to open the latter circuit and close a circuit through a conductor 166 leading directly to sequencing switch 156a and bypassing pulse counting means 154, for the purpose set forth more fully hereinafter. A lead 168 is also provided between lead 165 and sequencing switch 156a.

Presuming that dials 106 and 108 have been set in accordance with the program example described hereinabove, selector switch 112 will be manipulated to close the circuit through cell 46, as illustrated in FIG. 6. This sets the electronic control circuitry in a condition of readiness to achieve performance of the desired program of screw movement during the injection stroke thereof. The control circuitry at this time is de-energized and is adapted to be energized when screw 10 moves rearwardly to the start position thereof which results in the actuation of microswitch 84 as explained above. When screw 10 is moving rearwardly following an injection stroke, solenoid valve means 118 is de-energized whereby passageway 122 therethrough is in communication with bypass line 40 and return line 126 to fluid source 114, whereby fluid in chamber 30 is delivered back to the source. Further, during rearward movement of screw 10 the electronic control system is de-energized and such de-energization may be achieved in any desired manner. For example, a switch 170 may be provided in lead 130 from the AC power supply to open the circuit to the control system during rearward movement of the screw. A solenod 172 is provided for switch 170 which is operable when energized to close switch 170 to connect the control circuitry across the AC power supply. In the schematic illustration, solenoid 172 is connected across conductors 130 and 132 of the power source, as is solenoid valve 118, through microswitch 84 and lock-in switch means 174. When screw 10 moves rearwardly to the start position thereof, microswitch 84 is actuated to close the circuit across power lines 130 and 132, whereby solenoid 172 is energized to close switch 170 and solenoid valve 118 is energized to shift passageway 120 thereof to a position wherein the passageway interconnects the outlet line 124 of pump 116 with inlet line 34 of valve 32. It will be appreciated, of course, that valve passageway 122 is shifted to close communication between bypass line 40 and return line 126. Lock-in switch means 174 is operable in a manner well known to maintain the circuit closed through solenoid 172 and solenoid valve means 118 during movement of screw 10 in the direction of the injection stroke thereof which necessarily moves the micro switch actuator away from the switch arm. It will be appreciated, however, that other suitable lock-in means could be provided to perform this function.

With the electronic control circuitry now energized by the closing of switch 170, an electric signal is delivered from converter 158 through conductor 168 directly to sequencing switch 156a which operates in response to the signal to deliver a control signal to the corresponding switch 146a. In response to the latter signal, switch 146a is actuated to close a circuit through the corresponding resistance winding 144 whereby a control signal corresponding to the setting of the start speed dial is delivered to comparator 129 from which a proportional signal is delivered to valve coil 42a. In response to energization of coil 42a, valve passageway 32a is adjusted for the flow therethrough to be at a rate to provide for screw movement in the direction of the injection stroke from the start position of the screw at the desired speed. As screw 10 moves forwardly from the start position each one quarter inch of movement thereof causes cell 46 to be energized by light transmited thereto from bulb 44 through the slots in plate 52. Energization of cell 46 causes the latter to conduct, whereby for each one quarter inch of movement of the screw from the start position a pulse signal is delivered from converter 158 to pulse counting means 154. Pulse counters 154b – 154e count simultaneously, and when pulse counter 154b has counted the total number of pulses for which it has been set it operates to transmit a control signal to the corresponding sequencing switch 156b. Sequencing switch 156b is then operable, simultaneously, to cancel the control signal output of sequencing switch 156a and to deliver a control signal to switch 146b. Thus, switch 146a is de-energized opening the circuit to the corresponding resistance winding and switch 146b is energized to close a circuit through its corresponding resistance winding, whereby the previous speed control signal delivered to valve coil 42a is cancelled and a new signal is transmitted thereto corresponding to the speed at which the screw is to travel from position #1 thereof to position #2. Similarly, when pulse counter 154c has counted the total number of pulses for which it is set, it transmits a control signal to sequencing switch 156c whereby the output signal from sequencing switch 156b is cancelled and a control signal is delivered to switch 146c to change the speed control signal delivered to valve coil 42a in accordance with the speed setting of the resistance coil controlled by switch 146c. Pulse counters 154d and 154e and the corresponding sequencing switches 156d and 156e operate in a similar manner to achieve pre-selected speed changes of the screw at pre-selected positions thereof along the length of the injection stroke. When pulse counter 154e and sequencing switch 156e operate to deliver a control signal to switch 146e it will be appreciated that switch 146e will remain closed and and the screw will advance through the remainder of the injection stroke at a speed corresponding to the setting of the resistance coil energized through switch 146e since there are no further pulse counters and sequencing switches in the control circuitry. It will be appreciated, of course, that additional pulse counting and sequencing switch means could be provided as desired to increase the number of speed changes available and the number of positions at which speed changes are desired to take place. When screw 10 reaches the end of the injection stroke, suitable position sensing means 176 is actuated to de-energize lock-in means 174 to open the circuit through solenoid 172 of switch 170 and solenoid valve means 118, whereby switch 170 opens to de-energize the control system and valve means 118 shifts to provide for return flow of hydraulic fluid to source 114 in the manner described above. Return movement of screw 10 to the start position will again cause energization of the control system, whereby the succeeding injection stroke is achieved in accordance with the established program of movement which may be the same or a different program. In this respect, it will be appreciated that the speed setting and position setting dials can readily be adjusted between successive injection strokes if desired or necessary to alter or change the program of injection screw movement, it will be appreciated that the electronic circuitry can and preferably does include means providing for speed changes to be gradual at the various screw positions rather than instantaneous, whereby a smooth programmed curve of injection speed is achieved.

The control system further advantageously provides for movement of the injection screw to be at a single speed from the start position thereof throughout the entire stroke. In this respect, the desired speed of screw movement is selectively adjustable through start dial 106. Further, as mentioned, hereinabove, selector switch 112 is adapted to be manipulated to close a circuit through conductor 166 to sequencing switch 156a. When switch 112 is so positioned, a control signal is delivered directly to sequencing switch 156a from converter 158, whereby sequencing switch 156a is energized to deliver a control signal to electro-responsive switch 146a to close the latter switch. Thus, a speed control signal is delivered to valve coil 42a in accordance with the setting of the start dial. Sequencing switch 156a will remain energized in this instance for the entire stroke of the screw in view of the fact that the circuit from converter 158 through cell 46 to pulse counting means 154 is open.

In the foregoing example of screw feed control under a preset program, it has been assumed that five different screw feeds are desired and that speed changes are desired at four positions along the length of the screw stroke. It will be appreciated, however, that the control system provides for a program of screw movement wherein one or more speed changes are achieved at a corresponding one or more positions of the screw along the length of the injection stroke. For example, the start speed setting dial can be set to provide for a predetermined speed of screw movement from the start position to a first screw position, and the speed setting dial corresponding to position #1 can be set to provide for a desired screw speed from the first position to the end of the injection stroke. Position setting dials 108 of pulse counter 154b corresponding to position #1 would then be set in accordance with the distance that it is desired that the screw move at the first speed. Pulse counters 154c – 154e would be set to read 00 or any number less than that to which the dials of pulse counter 154b are set. When screw 10 moves rearwardly to start position the control circuitry is energized in the manner described above and a first control signal is delivered through sequencing switch 156a to electro-responsive switch 146a to close the latter switch whereby a control signal is delivered to valve coil 42a and fluid flow therethrough is provided for at a rate causing screw 10 to move from the start position at the selected start speed. When pulse counter 154b has counted a total number of pulses corresponding to the linear distance between the start position and position #1 of the screw, a signal is delivered therefrom to sequencing switch 156b, whereby the signal from sequencing switch 156a is cancelled and a signal is delivered to sequencing switch 146b to close the latter for a new speed control signal to be delivered to valve coil 42a to effect a change in the rate of flow through the valve and accordingly a change in the screw speed. Since pulse counters 154c – 154e are set below pulse counter 154b, counters 154c – 154e and the corresponding sequencing switches 156c – 156e will not function to cause further speed changes to take places. In this respect, sequencing switches 156a, 156e are electrically interrelated in a manner whereby sequencing switches 156b – 156e can not be energized to provide an output signal to the corresponding electro-responsive switch 146 unless the preceding sequencing switch is at that time producing an output signal to its corresponding switch 146. Accordingly, if in the foregoing example pulse counter 154c is set below pulse counter 154b the pulse count in counter 154c will reach its setting prior to counter 154b. When counter 154c reaches its setting counter 154b has not functioned to deliver a control signal to sequencing switch 156b and, therefore, sequencing switch 156c is inoperable in response to a signal from counter 154c to produce an output signal to swtich 146c. The same situation exists with regard to pulse counter 154d and 154e, whereby screw 10 moves from position #1 to the end of the injection stroke at the speed determined by the setting of the speed control dial corresponding to position #1. It will be appreciated too that if any one of the pulse counters 154b – 154e is set to a reading which corresponds to a distance of screw movement which is greater than the injuection stroke the counter will never reach the point at which it would provide an output to the corresponing sequencing switch. Accordingly, the screw will advance to the end of its stroke at a speed determined by the setting of the speed control dial corresponding to the screw position preceding the position corresponding to the pulse counter which has been set too high.

It will be appreciated in view of the foregoing description of the control system that a wide variety of programs of screw movement can readily be established simply by manual adjustment of control dials and that a given program of screw movement can readily be adjusted by manipulation of certain or all of the dials either between succeeding injection strokes or during a given injection stroke, should it be determined that such alterations or modifications are necessary to desirable to produce the best possible injection molded product. Moreover, the control arrangement not only provides for various programs of screw movement within a wide range of speeds and positions of speed change along the length of the screw stroke, but advantageously provides for extremely accurate control of these variables by providing for the speed and position adjustments to be in very small increments with respect to the total ranges thereof.

While considerable emphasis has been placed herein on the fact that the speed setting dials are rotatable about axes perpendicular to the plane of the panel board and that the position setting dials are thumb wheels rotatable about axes parallel to the panel board, it will be appreciated all of the dials could be of the same or similar structure within the present invention and in such case could, if desired, be provided with suitable distinguishing characteristics such as color coding, for example, to readily distinguish the speed setting dials from the position setting dials. Further, it will be distinctly understood that the term dial as used herein is intended to include any suitable type of indicator which is manually settable and is not limited to rotatable dials or the particular dial structures herein described. For example, a dial could be defined by a linearly movable indicator element rather than a rotatable element.

As many possible embodiments of the present invention may be made and as many possible changes may be made in the embodiment herein described, it is to be distinctly understood that the foregoing descriptive matter is to be interpreted merely as illustrative of the present invention and not as a limitation.

We claim:

1. In a plastic injection molding machine of the character having a chamber provided at one end with discharge nozzle means and a screw longitudinally reciprocable in said chamber and movable toward the discharge nozzle means through an injection stroke to eject plastic through the nozzle means and wherein hydraulic drive means including valve means is provided to displace the screw in the injection stroke direction and control means is provided to control the valve means of the hydraulic drive means and thus the movement of the screw during the injection stroke, the improvement which comprises: said valve means being an electro-responsive variable flow valve through which the rate of flow is proportional to the magnitude of an electric signal delivered thereto, and control means for sequentially delivering a plurality of electric control signals to said valve, said control signals being of predetermined magnitude and delivered to the valve in accordance with a program to achieve movement of said screw during the injection stroke thereof sequentially from a start position to an end position and through at least one intermediate position a predetermined distance from the start position and at a predetermined first linear speed from said start position to said intermediate position and a predetermined second linear speed from said intermediate position toward said end position, said control means including a panel board and dial means manually displaceable relative to said panel board and settable to establish a desired program, said dial means including at least first and second speed control dials and associated indicia sequentially arranged along a line on said panel board and settable individually, speed control circuit means responsive to setting of said first and second speed control dials to establish the magnitude of the control signals corresponding to said desired first and second screw speeds, said dial means further including at least one screw position setting dial means having indicia thereon corresponding to increments of the length of the injection stroke of the screw and settable to establish the desired intermediate position of the screw, screw position circuit means responsive to the setting of said screw position setting dial means to cause delivery to said valve of the electric control signal corresponding to said second screw speed when said screw reaches said intermediate position, manually actuable switch means for preparing said control means to perform said program, selector dial means for actuating said switch means, said selector dial means and said screw position setting dial means being positioned on said panel board along a line parallel to the line of the speed control dials and in alignment respectively with the first and second speed control dials along lines generally perpendicular to said parallel lines, and means actuated by said screw to energize said control means when said screw is in said start postion.

2. The improvement according to claim 1, wherein said means actuated by said screw includes second switch means, and actuator means movable with said screw for actuating said second switch means, said second switch means being adjustably positionable relative to said actuator means, whereby said start position of said screw is adjustable.

3. The improvement according to claim 1, and indicator means between said first speed control dial and selector dial means and between said second speed control dial and said position setting dial means energizable sequentially to indicate when said screw is moving at said first and second speeds.

4. In a plastic injection molding machine of the character having a chamber provided at one end with discharge nozzle means and a screw longitudinally reciprocable in said chamber and movable toward the discharge nozzle means through an injection stroke to eject plastic through said nozzle means and wherein hydraulic drive means including valve means is provided to displace the screw in the injection stroke direction and control means is provided to control the valve means of the hydraulic drive means and thus the movement of the screw during the injection stroke, the improvement which comprises: said valve means being an electro-responsive variable flow valve through which the rate of flow is proportional to an electric control signal delivered thereto, and electrical control means for delivering electric control signals to said valve for flow therethrough to move said screw in said injection stroke direction at first and second linear speeds, said control means including means to deliver a first electrical control signal to said valve of a magnitude to move said screw at said first speed in said injection stroke direction a predetermined distance to a first position in said direction, and means including detecting means responsive to movement of said screw to said first position to deliver a second electrical control signal to said valve of a magnitude whereby said screw then moves in said injection stroke direction at said second speed, said control means further including means whereby the magnitudes of said first and second control signals and the length of said first distance are manually settable and visually displayed.

5. The improvement according to claim 4, wherein said means to deliver said first and second electric control signals include manually settable variable voltage output devices having a voltage output range corresponding to zero to 100 percent of the maximum injection stroke speed of the screw.

6. The improvement according to claim 4, wherein said means to deliver said first and second electric control signals and said means responsive to movement of the screw to said first position each include manually settable electrical devices, dial means for setting said devices, and indicia means associated with each of said dial means for visually indicating the corresponding screw speed and distance settings thereof.

7. The improvement according to claim 4, wherein said position responsive means includes means to count electrical pulse signals corresponding to increments of movement of the screw in the injection stroke direction, said detecting means including means operatively associated with said screw to deliver electrical pulse signals to said counting means, and said counting means being operable to cause delivery of said second control signal when the pulse count therein corresponds with the linear distance of movement of said screw to said first position.

8. The improvement according to claim 7, wherein said means associated with said screw includes apertured plate means movable with said screw, light means and photo-responsive means on opposite sides of said plate means and fixed relative to said screw, whereby said photo-responsive means is intermittently energized by said light means during movement of said screw to produce electrical pulse signals each corresponding to an increment of movement of said screw.

9. The improvement according to claim 8, and limit switch means operatively associated with said screw and positioned to be actuated upon return movement of the screw following an injection stroke thereof to energize said control means and thereby initiate another injection stroke, the position of said switch means being adjustable longitudinally of the screw for varying the position of said screw at which the injection stroke is initiated.

10. In a plastic injection molding machine of the character having a chamber provided at one end with discharge nozzle means and a screw longitudinally reciprocable in the chamber and movable toward the discharge nozzle means through an injection stroke to eject plastic through said nozzle means and wherein hydraulic drive means including valve means is provided to displace the screw in the injection stroke direction and control means is provided to control the valve means of the hydraulic drive means and thus the movement of the screw during the injection stroke, the improvement which comprises: said valve means being an electro-responsive variable flow valve including electric control signal responsive means operable to control the rate of fluid flow through said valve in proportion to the magnitude of an electric control signal delivered thereto and thus control the linear speed of said screw in said injection stroke direction, means including a plurality of manually settable control signal delivering circuits operable to deliver electric signals of predetermined magnitude to said control signal responsive means, a normally open switch for each of said circuits, a switch actuating signal source for said switches, and circuit means between said source and switches including means to close a first of said switches for a first of said delivering circuits to deliver a first electric control signal to said control signal responsive means, means to detect movement of said screw in said injection stroke direction, and means responsive to movement of the screw to a first position in said direction to deliver a switch actuating signal from said source to a second of said switches to close said second switch and open said first switch for a second of said delivering circuits to deliver a second electric control signal to said control signal responsive means, whereby said screw moves to said first position at a linear speed directly proportional to the magnitude of said first electric control signal delivered upon closing of said first switch and thereafter moves in said direction at a linear speed directly proportional to the magnitude of said second electric control signal delivered upon closing of said second switch.

11. The improvement according to claim 10, wherein each of said control signal delivering circuits is manually settable for magnitude of the control signal delivered to said control signal responsive means to correspond to a speed of from 0 to 100 percent of the maximum injection stroke speed of said screw.

* * * * *